(12) United States Patent
Kuang

(10) Patent No.: US 11,039,676 B2
(45) Date of Patent: Jun. 22, 2021

(54) SYSTEM AND METHOD FOR SELECTING OR RECOMMENDING SKINCARE, HAIRCARE, BEAUTY OR FASHION PRODUCTS

(71) Applicant: Shaobo Kuang, Lansdal, PA (US)

(72) Inventor: Shaobo Kuang, Lansdal, PA (US)

( * ) Notice: Subject to any disclaimer, the term of this patent is extended or adjusted under 35 U.S.C. 154(b) by 84 days.

(21) Appl. No.: 16/517,625

(22) Filed: Jul. 21, 2019

(65) Prior Publication Data

US 2021/0015241 A1 Jan. 21, 2021

(51) Int. Cl.
*A45D 44/00* (2006.01)
*G06T 7/00* (2017.01)
*G06K 9/62* (2006.01)

(52) U.S. Cl.
CPC ......... *A45D 44/005* (2013.01); *G06K 9/6215* (2013.01); *G06T 7/0014* (2013.01); *A45D 2044/007* (2013.01); *G06T 2207/30201* (2013.01)

(58) Field of Classification Search
USPC .......................................................... 382/128
See application file for complete search history.

(56) References Cited

U.S. PATENT DOCUMENTS

| | | | |
|---|---|---|---|
| 9,235,782 B1* | 1/2016 | Zomet | G06K 9/00281 |
| 2005/0043897 A1* | 2/2005 | Meyer | G06Q 30/02 |
| | | | 702/19 |
| 2009/0185723 A1* | 7/2009 | Kurtz | G06K 9/00926 |
| | | | 382/118 |
| 2011/0249863 A1* | 10/2011 | Ohashi | G06K 9/00234 |
| | | | 382/103 |
| 2012/0195495 A1* | 8/2012 | Shiell | G06K 9/6219 |
| | | | 382/159 |

* cited by examiner

*Primary Examiner* — Jerome Grant, II

(57) ABSTRACT

A product system comprises a unit for obtaining one or many face attributes of a person; a comparing unit for comparing the person's face with well-known people's face to find matched well-known people; a product unit for displaying and presenting one or many the found skincare, beauty or fashion products used by or recommended by the matched well-known people to the person.

20 Claims, 8 Drawing Sheets

SYSTEM AND METHOD FOR SELECTING OR RECOMMENDING SKINCARE, HAIRCARE, BEAUTY OR FASHION PRODUCTS

FIELD OF THE INVENTION

The present invention relates to systems and methods for helping people to select skincare, makeup, haircare, beauty or fashion products, and more particularly to systems and methods for helping people to buy skincare, makeup, haircare, cosmetic, beauty or fashion products on-line.

BACKGROUND OF THE INVENTION

With the developing of Internet technology, on-line shopping has become increasingly popular. However, most people feel difficulty to make decisions of selecting products when shopping on-line, especially for selecting cosmetic, beauty, or fashion products. Therefore, many people order wrong products and have to mail the products back for return. This causes a lot of waste for both buyers and sellers. When shopping for cosmetic or beauty products, most people would like to have someone give them suggestions or comments on the products they are looking for. Many shopping sites will allow their customers to pick products by selecting their features. However, too many options, selections or features of products create anxiety and leave customers less satisfied.

SUMMARY OF THE INVENTION

It is, therefore, the objects of the present invention are intended to overcome the drawbacks of the conventional art.

Accordingly, an object of the present invention is to provide systems and methods for helping people to select skincare, haircare, medical treatment, cosmetic, beauty or fashion products when they are shopping on-line.

Another object of the present invention is to provide systems and methods for helping people to purchase skincare, haircare, cosmetic, beauty or fashion products from on-line shops.

Another object of the present invention is to provide systems and methods for allowing people to easily find out suitable skincare, cosmetic, haircare, beauty or fashion products on-line.

Another object of the present invention is to provide systems and methods for reducing the amount of ordering wrong items from on-line retail stores.

Another object of the present invention is to provide systems and methods for giving people one or many Feng Shui recommendations or suggestions.

Another object of the present invention is to provide systems and methods for assigning beauty or handsome scores to people.

Another object of the present invention is to provide systems and methods for assigning wealth scores to people.

Another object of the present invention is to provide systems and methods for assigning happiness scores to families.

Another object for present invention is to provide systems and methods for assigning wealth or business success scores to people's business partners.

Further objects and advantages of present invention will become apparent from a consideration of the drawings and ensuring descriptions.

A system according to the present invention comprises:
means for obtaining a picture of a person;
means for analyzing the picture of the person;
means for obtaining one or many face attributes of the person based on the analyzing;
means for suggesting or recommending skincare, haircare, glasses, makeup, cosmetic, beauty or fashion products to the person based on the obtained face attributes.

A method according to the present invention comprises:
obtaining a picture of a person;
analyzing the picture of the person;
obtaining one or many face attributes of the person;
comparing the obtained face attributes of the person with one or many stored face attributes of one or many well-known people;
finding one or many matched or close-matched well-known people based on the comparation;
finding one or many skincare, hare care, makeup, glasses, cosmetic, beauty or fashion products which are used or recommended by the matched or close-matched well-known people;
displaying, listing or presenting the matched or closed-matched well-known people's pictures, images, animations or videos to the person;
displaying, listing or presenting the skincare, hare care, makeup, cosmetic, glasses, beauty or fashion products used by or recommended by the matched or close-matched well-known people.

A method of assigning beauty scores according to the present invention comprises:
obtaining a picture of a person;
analyzing the picture of the person;
obtaining one or many face attributes of the person;
comparing the obtained face attributes with one or many stored face attributes of one or many well-known people;
finding one or many well-known people whose faces attributes match, close-match, or are similar to the face attributes of the person based on the comparation, and obtaining a percentage of the similarity or match between the face attributes of the person and the face attributes of the matched or close-matched well-known people;
obtaining beauty or handsome scores for the matched or the close-matched well-know people;
assigning a beauty or handsome score to the person based on the beauty or handsome score of the matched or close-matched well-known people, and the similarity or match percentage.

A method of assigning wealth scores according to the present invention comprises:
obtaining a picture of a person;
analyzing the picture of the person;
obtaining one or many face Feng Shui attributes of the person;
comparing the obtained face Feng Shui attributes with one or many stored face Feng Shui attributes of one or many wealthy people;
finding one or many wealthy people whose faces Feng Shui attributes match, close-match, or are similar to the face Feng Shui attributes of the person based on the comparation, and obtaining a percentage of the similarity or match between the face Feng Shui attributes of the person and the face Feng Shui attributes of the matched or the close-matched wealthy people;

obtaining wealth scores for the matched or the close-matched wealthy people;

assigning a wealth score to the person based on the wealth scores of the matched or close-matched wealthy people, and the similarity or match percentage.

The present invention is described in the detail below, together with its further objectives, features, and advantages, in conjunction with the following drawings:

DETAILED DESCRIPTION OF THE INVENTION

Reference will now be made in detail to the preferred embodiments of the present invention, methods and systems of recommending skincare, haircare, beauty or fashion product to users, examples of which are illustrated in the accompanying drawings.

Figure 1:
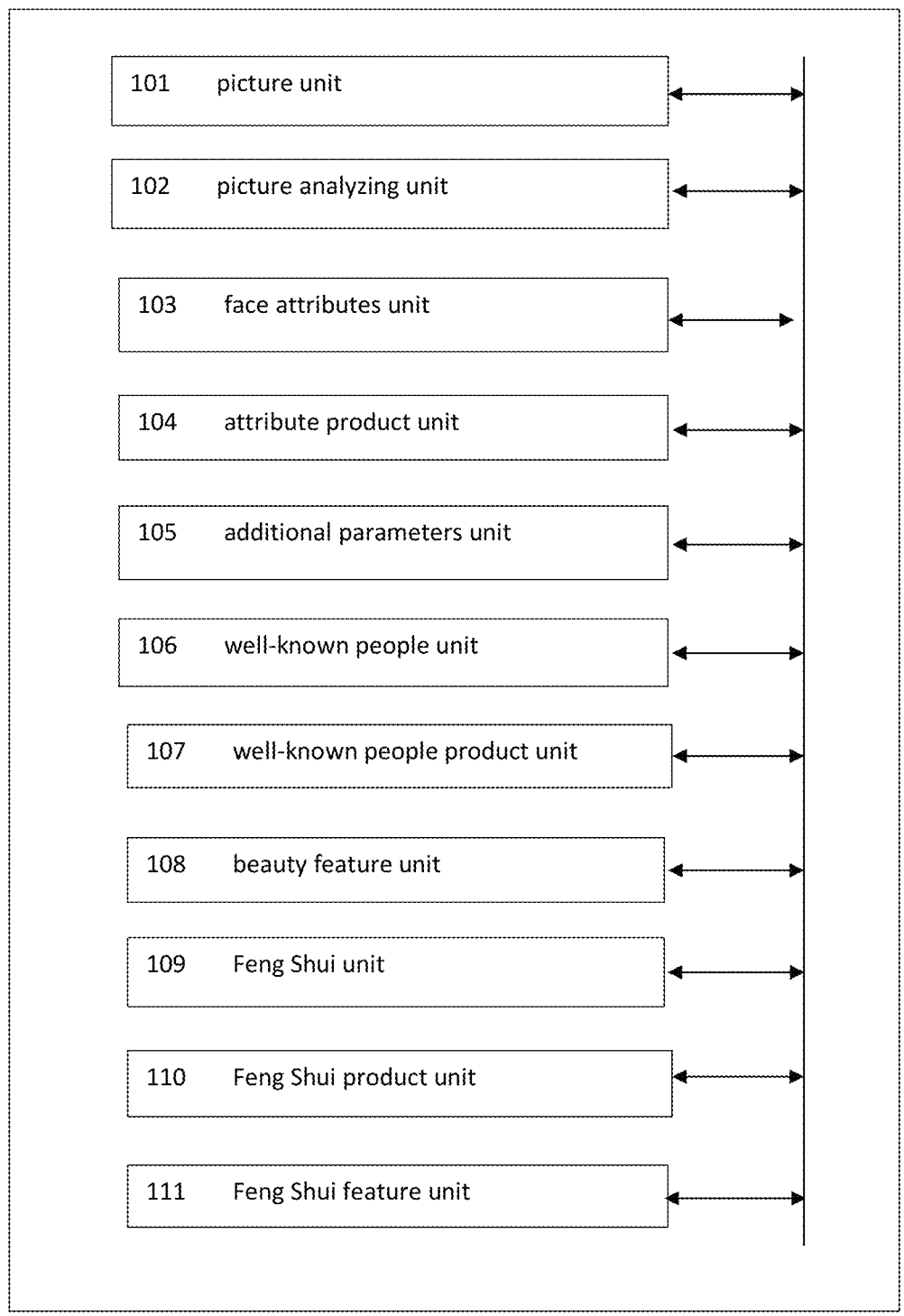
FIG. 1 is a block diagram of a skincare or beauty system suitable for practicing various embodiments of the invention.

Referring now to the drawings, FIG. 1 shows a skincare or beauty system in accordance with the present invention. In the present embodiment, a skincare or beauty system 100 comprises a picture unit 101, a picture analyzing unit 102, a face attributes unit 103, an attribute product unit 104, an additional parameters unit 105, a well-known people unit 106, a well-known people product unit 107, a beauty feature unit 108, a Feng Shui unit 109, a Feng Shui product unit 110, and a wealth feature unit 111.

Feng Shui, also known as Chinese geomancy, is pseudo-science originating from ancient China, which claims to use energy forces to harmonize individuals with their surrounding environment. To some extent, we all read faces all of the time. Some face reading methods, like Chines Feng Shui, use many rules and regulations on face attributes to tell people about their wealth and prosperity.

The picture unit 101 allows a user to upload one or many pictures, photos or images of a person to the system 100 from his or her PCs, iPads, mobile phones through Internet or apps, or allows a user to capture one or many pictures of a person from a camera, and upload these captured pictures to the system. The picture unit 101 may also obtain the pictures of a person from the pictures in his personal profile or from his or her social networks (FACEBOOK, INSTAGRAM, TWITTER, WECHAT and etc.), his or her websites, or his or her pictures in his or her friends' social networks. The picture analyzing unit 102 analysis the uploaded or the captured pictures and identifies the face of the person in the uploaded pictures. The face attributes unit 103 obtains or determines one or many face attributes of the person based on the picture analyzing. The face attributes unit 103 can directly search, obtain or determine one or many face attributes of a person, from databases, search engines, Internet, or third-party systems, based on his or her logon data, his or her session data, or his or her cookies cache data. For example, when the person uses his web Brower to navigate the web, the face attributes unit 103, based on his browser cookies cache data, obtains his name, id or other identification data, and finds out his face attributes from a database, a search engine or a third-party system, which pre-stores one or many face attributes or one or many pictures of the person. These attributes may include: gender, age, ethnicity, face width, face height, facial hair type, hair type, hair color, eyes type, eyes size, eyes color, noise type, noise size, lips type, lips size, skin color, skin type, person's emotion, wide face, small face, normal forehead size, wide or big noise, small chin, good face symmetry, Asia small eyes, Asia skin, dry skin, normal skin, thin hair, fine hair, and etc. The attribute product unit 104 finds and recommends one or many skincare, haircare, makeup, beauty or fashion products based on the obtained face attributes and the stored detail products' information, which is associated to one or many face attributes. The products can also be food, drinks, cars, fitness services or equipment. For example, if the face attribute of "dry skin" has been determined by the attribute unit 103, the attribute product unit 104 will find or obtain one or many brands of moisture lotion for dry skin from a product database by querying moistening skin, and recommend the obtained moisture lotions to the person. The skincare, haircare, makeup, cosmetics, healthcare, beauty or fashion products maybe purifying cleanser, eye creams, facial radiance pads, protein shake, super seed facial oil, multi-acid body peel, face mask, overnight cream, face sunscreens, glasses or sun glasses, hats, caps, ties, and etc. The additional parameters unit 105 obtains one or many additional parameters which include dates and times of the pictures, positions or locations of the pictures, the name of the person, even the social contacts of the person, and etc. The well-known people unit 106 compares the obtained faces attributes of the person with stored one or many face attributes of one or many well-known people, and, based on their similarities (the percentages of the match between the face attributes of the person and the face attributes of the well-known people), find out one or many well-known people whose face attributes match, closed-match, or are similar to the face attributes of the person. The well-known people could be celebrities, movie stars, singing stars, actors, actresses, singers, sports stars, models, or even the friends or relatives of the person. The stored sample face attributes for well-known people could be obtained from the pictures of the 100 world most beautiful faces of 2018 and the 100 world most handsome faces of 2018. The well-know people unit 105 obtains and stores beauty or handsome scores for the stored well-known people. The beauty scores for the well-known people can be obtained from independent reviewing groups or by public votes. The scores of well-known people may vary based on the different years of voting or the different groups of voting. However, this reflects the real world. People could change their beauty judgements by years or by locations. The well-know people unit 105 also assigns a beauty or handsome score to the person based on the similarity between the person and the matched or close-matched well-known people, and the stored beauty or handsome scores of the matched or close-matched the well-know people. The well-known people product unit 107 searches from one or many databases, manufactures' systems, social networks, or Internet, finds out the skincare, haircare, healthcare, fashion, or beauty products, which are used, recommended or promoted by the matched or close-matched well-known people, and proposes, recommends, displays, lists, email, or presents (in graphics, videos, voices, or live shows) these products to the person. The beauty feature unit 108 obtains one or many face beauty features of the person based on the picture analyzing, and suggests or recommends the person on how to change or adjust his or her makeups, fashion to improve his or her face beauty, or even suggests or recommends one or many treatments, exercises or surgeries to the person to improve his or her face beauty. The obtained beauty features include positive features, neutral features, or negative features. An example of a positive features is beautiful eyes, and an example of a negative feature is there is a scar on his or her face. The Feng Shui unit 109 obtains or determines one or many face Feng Shui attributes of the person based on the picture analyzing. The face Feng Shui attributes may include perfect or lucky forehead, or other wealth spots in people's faces. The Feng Shui unit 109 also compares the face Feng Shui attributes of the person with stored face Feng Shui attributes of one or many wealthy or successful people, and, based on their similarities, finds out one or many wealthy or successful people whose faces Feng Shui attributes match, close-match, or are similar to the face Feng Shui attributes of the person, and assigns a wealth score to the person based on the similarity percentage between the person's face Feng Shui attributes and the matched or the close-matched wealth peoples' face Feng Shui attributes, and stored wealth scores of the matched or close-matched wealthy people. The wealth scores of the wealthy people can be calculated or obtained from their real wealthy value. For example, the wealth score for the world richest man, Bill Gates, is 100. The Feng Shui product unit 110 searches from one or many databases or systems, social networks, or Internet, and find out the Feng Shui, skincare, healthcare, or other beauty or fashion products used or recommended by the matched or close-matched wealthy people, proposes, recommends, displays, lists, email, text message or presents (in graphics, videos, voices, or live shows) these products to the person. The Feng Shui products maybe Chinese zodiac sign, business ties, glasses or sunglasses, caps or hats, or other makeup products. The Feng Shui feature unit 111 obtains one or many face Feng Shui features of the person based on the picture analyzing, and suggests or recommends the person on how to change or adjust his or her makeups, fashion to improve his or her wealthy Feng Shui, or even suggests or recommends one or many treatments, exercises or surgeries to the person to improve his or her wealthy Feng Shui. The obtained Feng Shui features include positive features, neutral features, or negative features. The wealthy people can be local wealthy people, such as 100 the richest people in Asia.

In one example, the picture unit 101 obtains a picture of a person. The picture analyzing unit 102 analyzes the picture by using image processing, artificial intelligence (AI), big data or other technologies to identify the face of the person in the picture, and obtains one or many face attributes of the person. The well-known people unit 106 compares the obtained face attributes of the person with the stored face attributes of one or many well-known people, find out one or many well-known people whose faces attributes match or close-match the face attributes of the person, or whose faces look similar to the person's face. The well-known people product unit 107 searches from one or many databases, manufactures' systems, social networks, or Internet, and finds out the skincare, haircare, healthcare, fashion, or beauty products used or recommended by the found well-known people who look similar to the person, and proposes, recommends, displays, lists, email, or presents (in graphics, videos, voices, or live shows) these products to the person. The well-known people product unit 107 also displays or presenting the pictures, images, animations or videos of the matched or the close-matched well-known people to the person. The well-known people product unit 107 also displays or presenting the pictures, images, animations or videos of the matched or the close-matched well-known people and the found skincare, haircare, healthcare, fashion, or beauty products to the person. The well-known people product unit 107 also displays or presenting the pictures, images, animations or videos of the matched or the close-matched well-known people and other products like food, drinks, cars, fitness services or equipment, haircare to the person. The well-known people product unit 107 also plays commercial advertisements starring the matched or the close-matched well-known people to the person. In this case, the matched or close-matched well-known people play a role in commercial advertisements. In another words, the well-known people product unit 107 also plays commercial advertisements, wherein the matched or the close-matched well-known people appear or play a role, to the person. In this case, the matched or close-matched well-known people play a role in commercial advertisements. The well-known people are trusted by public. In the present embodiment, the well-known people can be local well-known people, like top 100 most beautiful women in Asia, or even in an organization. In another example, the well-known people are sales or customer service people, and the well-known product unit 106 compares the obtained face attributes of the person with the stored face attributes of one or many sales or customer service people, find out one or many sales or customer service people whose faces attributes match or close-match the face attributes of the person, or whose faces look similar to the person's face. In this case, the well-known people product unit 107 will open a live on-line showroom, and allow the matched or close-matched well-known people, or sales people to show or demo the products to the person. In the showroom, the matched or close-matched well-known people or sales people can interact with the person. For example, the matched or close-matched sales people can answer questions asked by the person. The on-line showroom can be enabled by virtual reality, and the person will be able to experience first-hand or touch on the products. The present invention allows the well-known, who are trusted by public, and whose faces are similar to the person, to present beauty, fashion or other products to the person. Since their facial conditions are similar, the products used or recommended by the well-known people are more suitable or fit to the person.

Figure 2:
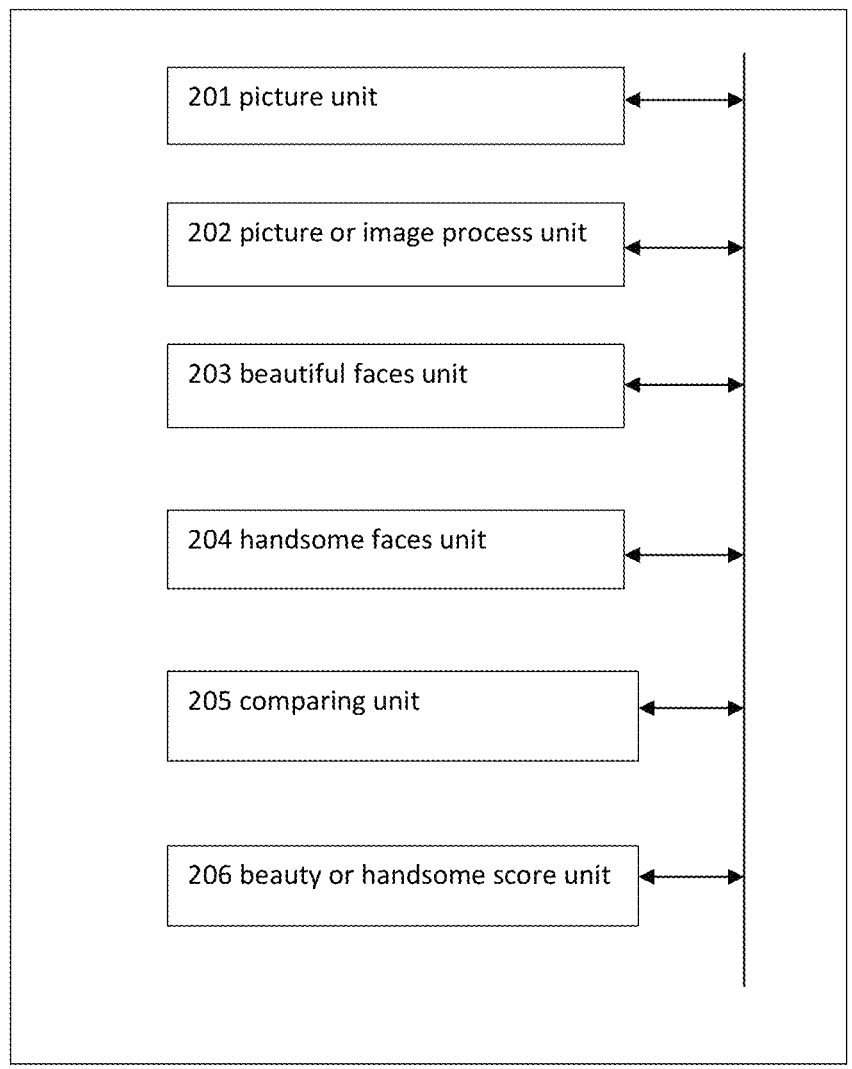
FIG. 2 is a block diagram showing a beauty score system according to the present invention.

FIG. 2 shows a beauty or handsome score system according to the present invention. The beauty or handsome score system 200 comprises: a picture unit 201 for obtaining a picture of a person, a picture or image process unit 202 for processing the picture and obtain one or many face attributes of the face of the person, a beautiful faces unit 203 for storing one or many attributes of one or many beautiful faces of well-know people and a beauty scores for each of the beautiful faces, a handsome faces unit 204 for storing one or many face attributes of one or many handsome faces of well-know people and a handsome score for each of the handsome faces, a comparing unit 205 for comparing the obtained face attributes of the person with the stored beautiful face attributes or the stored handsome face attributes to obtain the similarity percentages between the person's face and the beautiful or handsome faces, find the most matched or the most close-matched beautiful face or the most matched or the most close-matched handsome face, and percentages between the person's face and the most matched or the most close-matched beautiful or handsome face, a beauty or handsome score unit 206 for assigning a beauty or handsome score to the person based on the matched similarity percentage and the score of the matched beautiful or handsome face. In the present embodiment, the beautiful faces unit 203 stores the face attributes of the top 100 most beautiful women in the world voted by fans, and calculates their beauty scores based on their ranks voted by fans. The handsome faces unit 204 stores the face attributes of the top 100 most handsome men in the world voted by fans, and calculates their handsome scores based on their ranks voted by fans.

Figure 3:
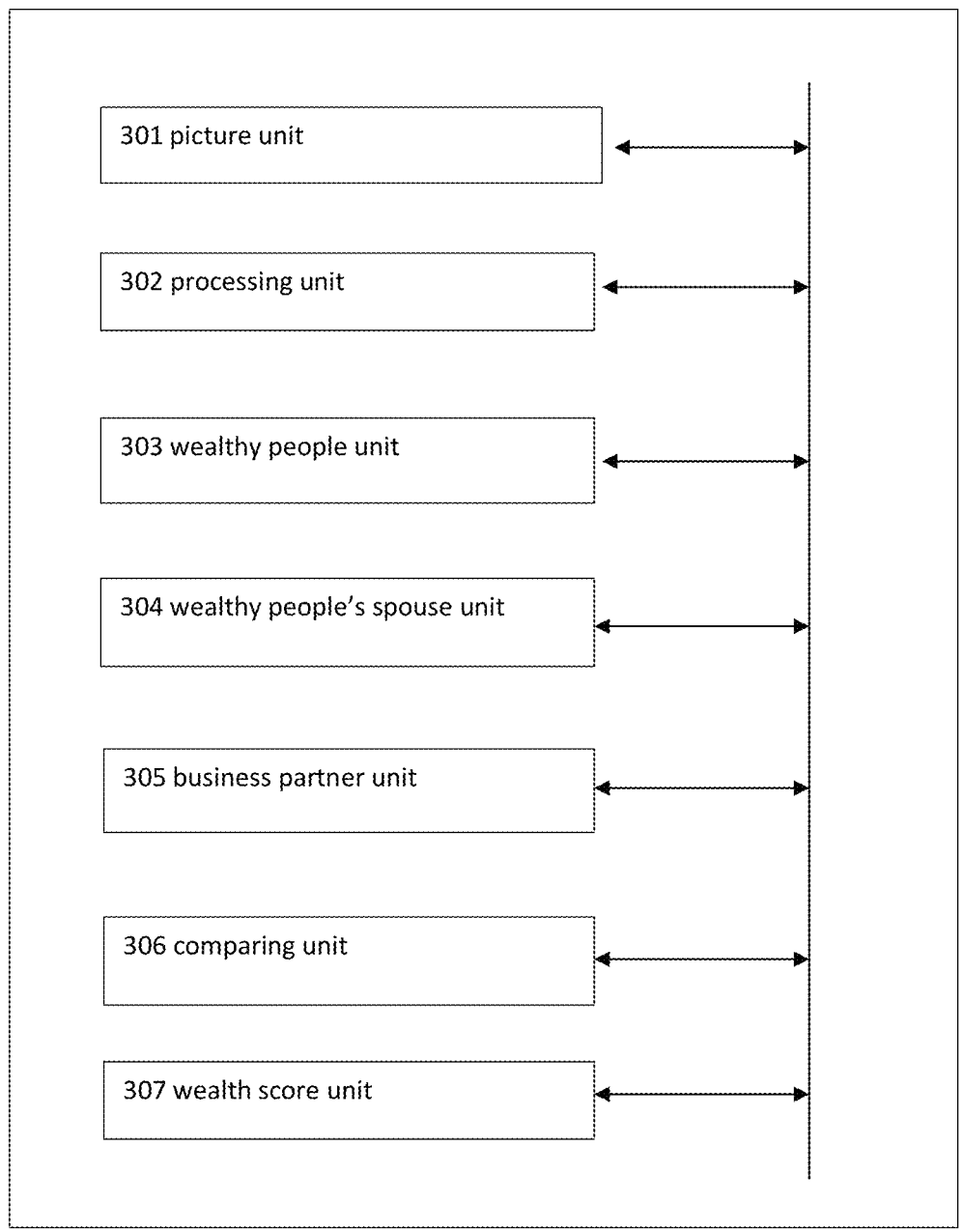
FIG. 3 is a block diagram showing a wealth score system according to the present invention.

FIG. 3 shows a wealth score system according the present invention. The wealth score system 300 comprises: a picture unit 301 for obtaining or capturing a picture, photo or image of a person, a processing unit 302 for processing the picture, photo or image, and obtaining one or many Feng Shui attributes of the person, a wealthy people unit 303 for storing one or many Feng Shui attributes of one or many wealthy people and one or many wealth scores of the wealth people, a wealthy people's spouse unit 304 for storing one or many Feng Shui attributes of the wealthy people's spouses and one or many wealth scores of the wealthy people's spouses, a business partner unit 305 for storing one or many Feng Shui attributes of the wealthy people's business partners and wealth scores for the wealthy people's business partners, a comparing unit 306 and a wealth score unit 307. The comparing unit 306 compares the Feng Shui attributes of the person with the stored Feng Shui attributes of one or many wealthy people, finds out or obtains the most matched or the most close-matched wealthy people, and obtains or determines the percentage of the similarity or match between the Feng Shui attributes of the person and the Feng Shui attributes of the matched or the close-matched wealthy people. The wealth score unit 307 assigns a Feng Shui wealth score to the person based on the similarity percentage, or the wealth scores or ranks of the most matched or the most close-matched wealthy people, or the combination of the similarity percentage and the wealth scores of the most matched or the most close-matched wealthy people. The wealth scores or ranks of the wealthy people could be determined by their wealthy values. For example, if the Feng Shui attributes of the person perfect match the Feng Shui attributes of Bill Gates, who is the world's richest man, and his wealth score will be 100 or close to 100. Thus, the Feng Shui wealth score of the person is 100 or close to 100.

One example of Feng Shui attribute is the sizes or shapes of the people foreheads. A round, high, big forehead indicates power and wealth. Another example of Feng Shui attribute is the sizes or the shapes of the people noses. A rounder and fleshier the nose indicates wealth and luck.

The picture unit 301 also obtains a picture of the spouse of the person. The picture or image process unit 302 processes the picture and obtains one or many Feng Shui attributes of the face of the spouse of the person. The wealthy people spouse unit 304 stores one or many Feng Shui attributes of the wealthy people's spouses and wealth scores for the wealth people's spouses. In this case, the comparing unit 306 compares the Feng Shui attributes of the person's spouse with the stored Feng Shui attributes of the spouse of the most matched or close-matched the wealthy people, and obtains or determines the percentage of the similarity or match between the Feng Shui attributes of the person's spouse and the Feng Shui attributes of the matched or the close-matched wealthy people's spouse. The wealth score unit 307 assigns a Feng Shui wealth score to the person's spouse based on the similarity percentage, or the wealth scores or ranks of the most matched or the most close-matched wealthy people's spouses, or the wealth scores or ranks of the most matched or the most close-matched wealthy people, or the combinations of them. For example, if the Feng Shui attributes of the person's wife match about 80% of the Feng Shui attributes of Bill Gates's wife, Melinda Gates, who is the world's richest woman, and her wealth score will be 100 or close to 100. Thus, the Feng Shui wealth score of the person's wife is 80 or close to 80.

The picture unit 301 also obtains a picture of a business partner of the person. The picture or image process unit 302 processes the picture and obtains one or many Feng Shui attributes of the face of the business partner of the person. The business partner unit 305 stores one or many Feng Shui attributes of the wealthy people's business partners and wealth scores for the wealth people's business partners. In this case, the comparing unit 306 compares the Feng Shui attributes of the person's business partner with the stored Feng Shui attributes of one or many the business partners of the most matched or close-matched the wealthy people, and obtains or determines the percentage of the similarity or match between the Feng Shui attributes of the person's business partner and the Feng Shui attributes of the matched or the close-matched wealthy people's business partner. The wealth score unit 307 assigns a Feng Shui wealth score to the person's business partner based on the similarity percentage, or the wealth score or rank of the most matched or the most close-matched wealthy people's business partner, or the wealth score of the most matched or the most close-matched wealthy people, or the combinations of them. For example, if the Feng Shui attributes of the person's business partner match about 60% of the Feng Shui attributes of Bill Gates's business partner, Paul Allen, who is the one of the world's richest men and his wealth score will be 90 or close to 90, the Feng Shui wealth score of the person's business partner is 54 or close to 54. The combined business wealth score will be about 80+54/2=67.

Figure 4:
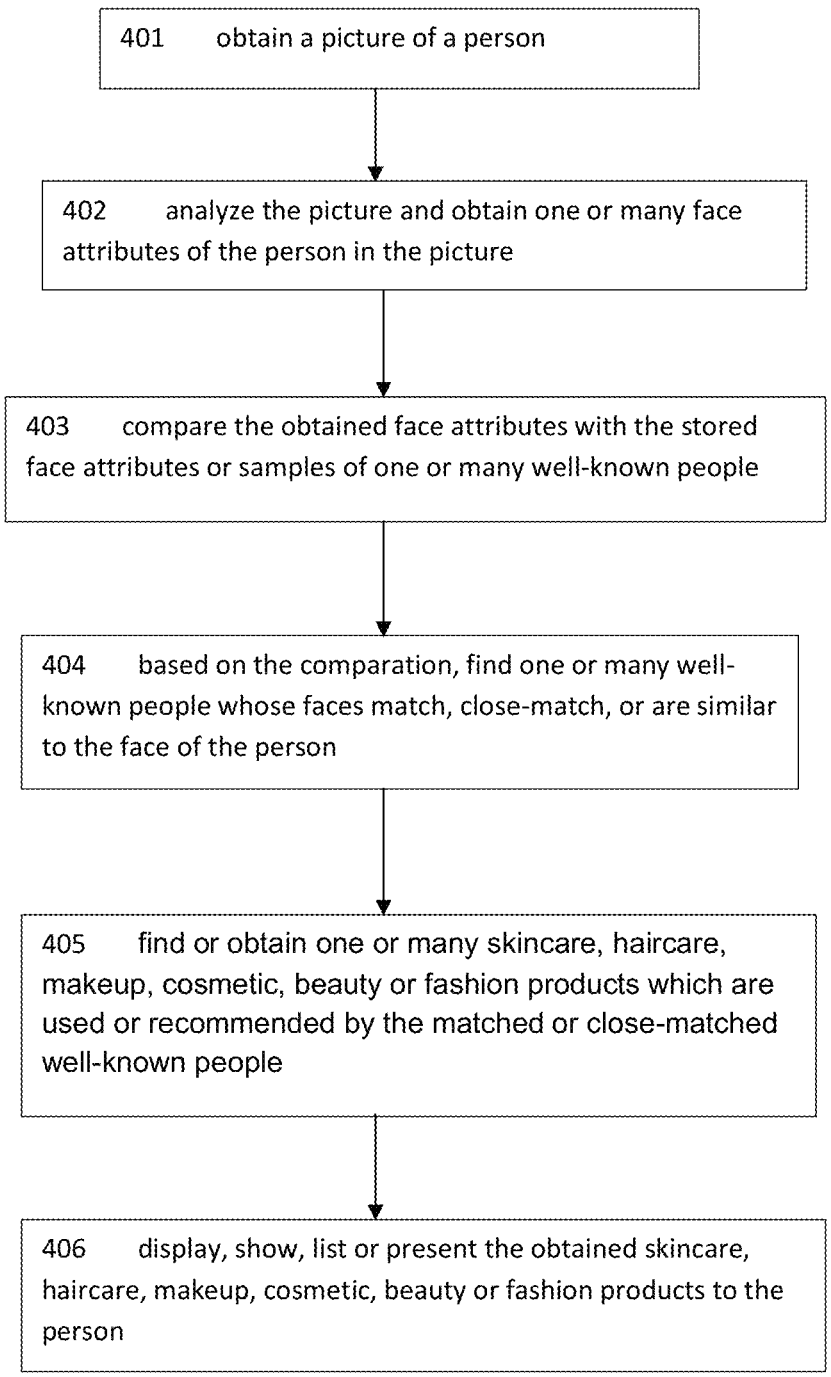
FIG. 4 is a flow diagram illustrating a method of presenting beauty or fashion products to a user according to the present invention.

FIG. 4 illustrates a method of presenting skincare, haircare, beauty or fashion products to users according to the present invention. At 401, the present embodiment obtains a picture, photo, image of a person. It can be done by uploading a picture by a user, or capturing a picture from a camera, or even obtaining a picture from a person's social networks. At 402, the present embodiment analyzes the picture and obtains one or many face attributes of the person. At 403, the present embodiment compares the obtained face attributes with stored face attributes of one or many well-known people. At 404, the present embodiment, based on the comparation, finds out or obtains one or many well-known people whose faces match, close-match, or are similar to the face of the person. At 405, the present embodiment finds out or obtains one or many skincare, haircare, makeup, cosmetic, beauty or fashion, glasses or sunglasses products which are used or recommended by the matched or close-matched well-known people. At 406, the present embodiment displays, shows, lists or presents the obtained skincare, haircare, makeup, cosmetic, beauty, fashion, glasses or sunglasses products to the person.

Figure 5:
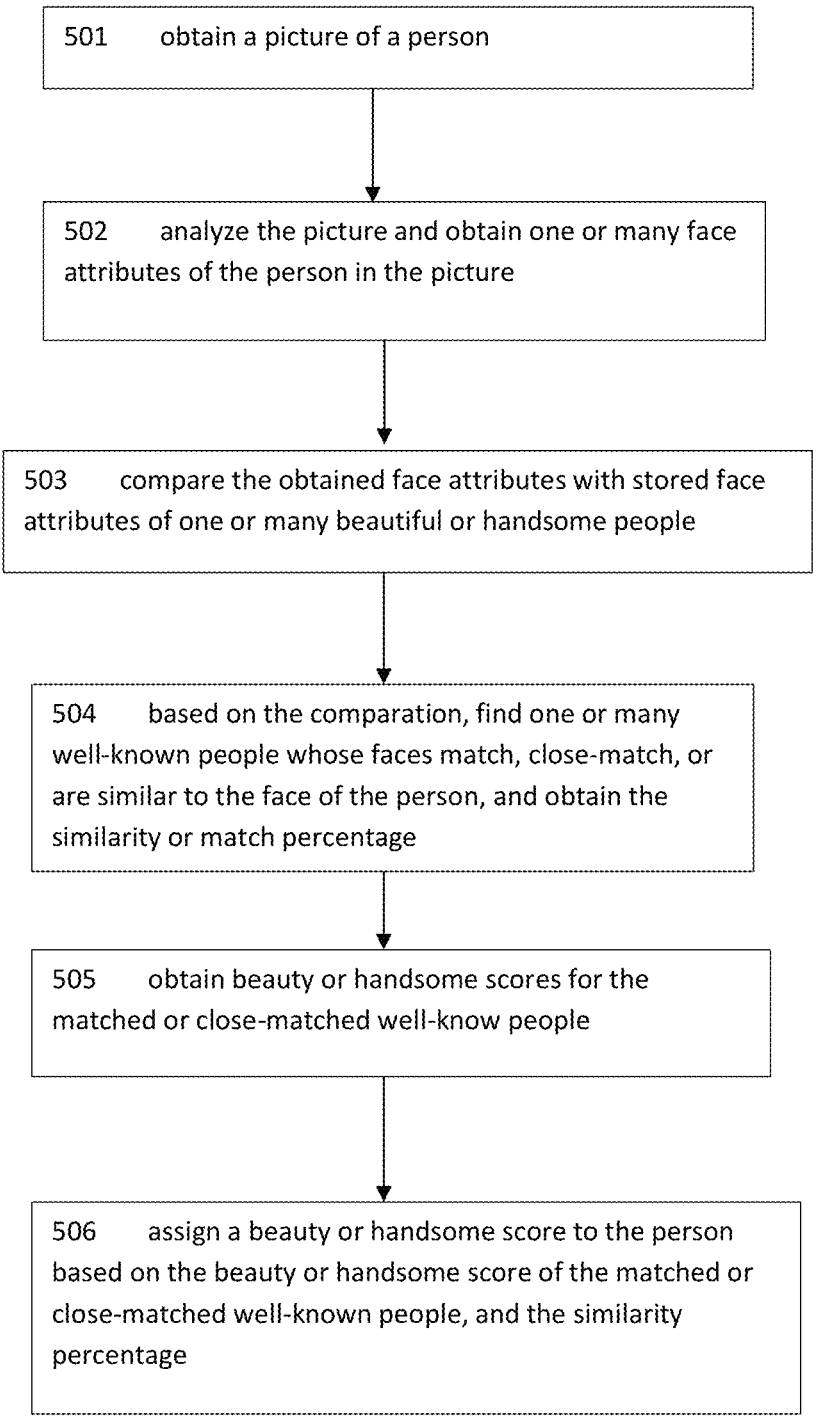
FIG. 5 is a flow diagram illustrating a method of assigning a beauty or handsome score to a person according to the present invention.

In the present embodiment, the well-know people are celebrities, such as movie starts, sports stars, singers, musicians, novel or poetry writers. The well-known people can also be politicians, artists, designers, scientists, or even sales people. The well-known people, can also be the ones who have the most followers in social networks, FIG. 5 illustrates a method of assigning beauty or handsome scores to users according to the present invention. At 501, the present embodiment obtains a picture, photo or image of a person. It can be done by uploading a picture by a user, or capturing a picture from a camera. At 502, the present embodiment analyzes the picture and obtains one or many face attributes of the person. At 503, the present embodiment compares the obtained face attributes with stored face attributes of one or many well-known people. At 504, the present embodiment, based on the comparation, finds one or many well-known people whose faces match, close-match, or are similar to the face of the person, and obtains the similarity or match percentage between the person's face and the matched or close-matched well-known people's face. At 505, the present embodiment obtains one or many beauty or handsome scores of the matched or close-matched well-know people. It can be done by searching from a database or system, or even from Internet. For example, the well-know people are the 100 'Most Beautiful' Female Faces Of 2018" around the world. Their scores are based on their ranks which are voted by independent professional people or public. At 506, the present embodiment assigns a beauty or handsome score to the person based on one or many stored beauty or handsome scores of the matched or close-matched well-known people and the similarity or match percentage.

Figure 6A:
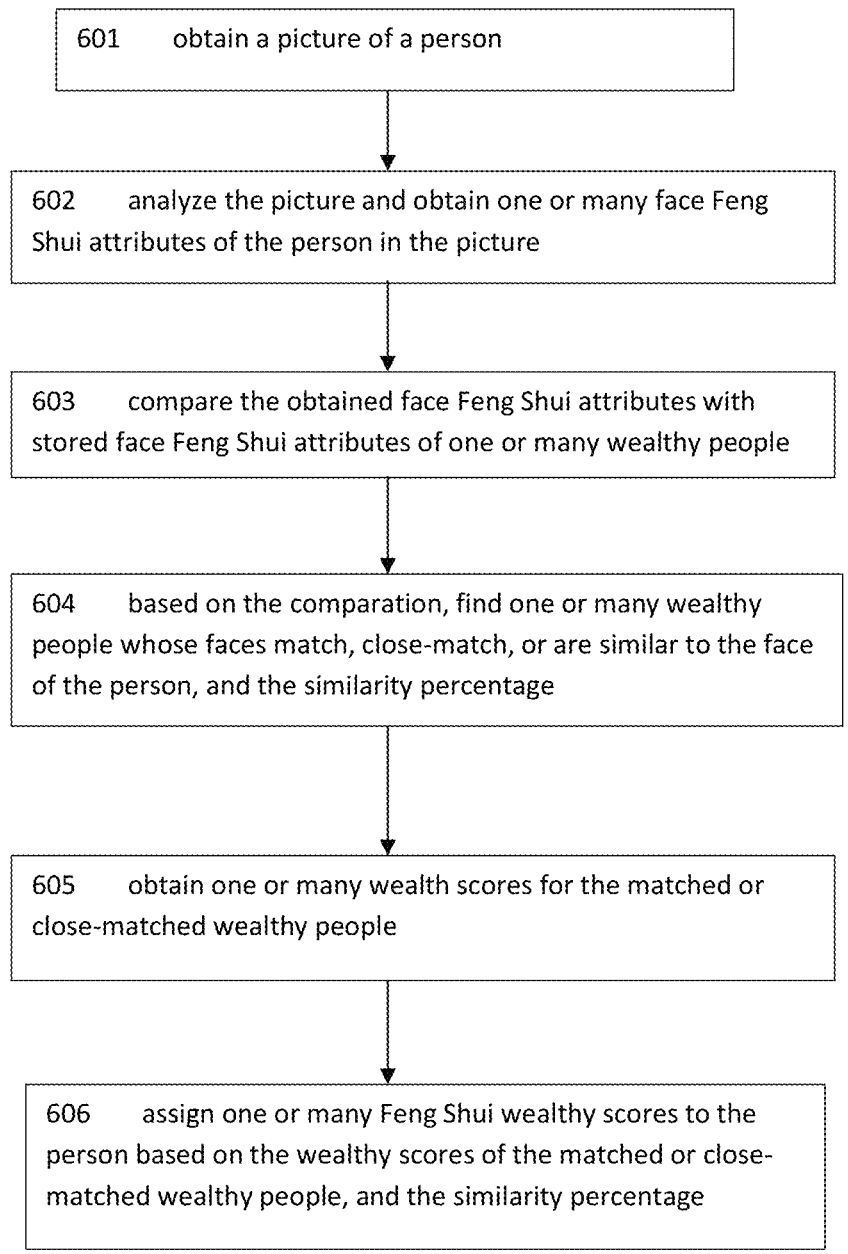
FIG. 6A is a flowchart illustrating a method of assigning a wealth score to a person according to the present invention.

FIG. 6A illustrates a method of assigning wealth scores to users according to the present invention. At 601, the present embodiment obtains a picture, photo or image of a person. It can be done by uploading a picture by a user, or capturing a picture from a camera. At 602, the present embodiment analyzes the picture and obtains one or many face Feng Shui attributes of the person. At 603, the present embodiment compares the obtained face Feng Shui attributes with stored face Feng Shui attributes of one or many wealthy people. At 604, the present embodiment, based on the comparation, finds one or many wealthy people whose faces Feng Shui attributes match, close-match, or are similar to the face Feng Shui attributes of the person, and obtains or determines the similarity or match percentage between the person's face Feng Shui attributes and the matched or closed-matched wealthy people's face Feng Shui attributes. At 605, the present embodiment obtains wealth scores of the matched or close-matched wealthy people. For example, the wealthy people can be found from FORBES world's billionaires list, and their wealth scores can be calculated from or based on their wealthy values. At 606, the present embodiment assigns a Feng Shui wealth score to the person based on the wealth score of the matched or close-matched wealthy people and the similarity or the match percentage between the person's Feng Shui attributes and the matched or close-matched wealthy people's Feng Shui attributes.

Figure 6B:
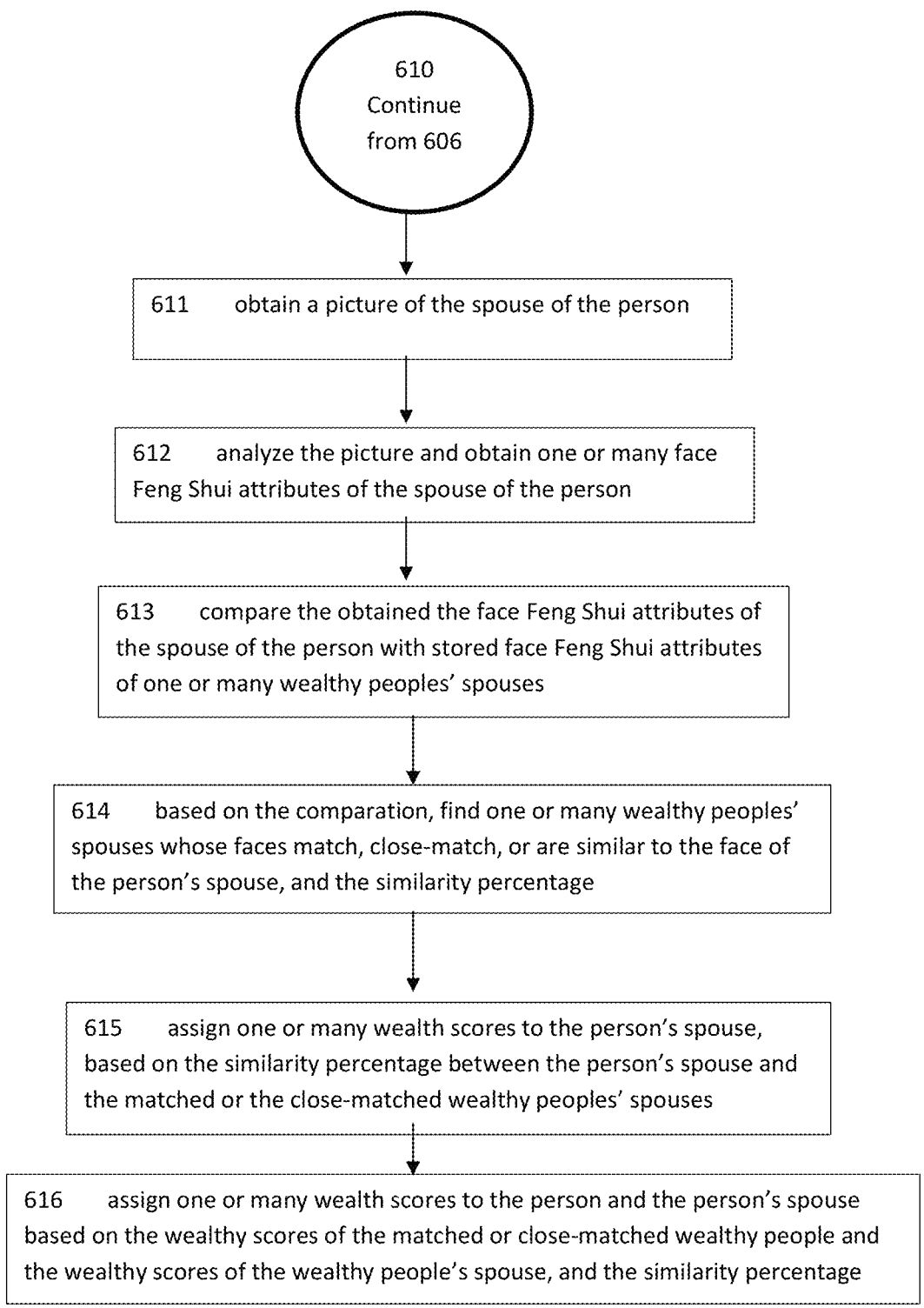
FIG. 6B is a flowchart illustrating a method of assigning a wealth score to a person's spouse according to the present invention.

FIG. 6B illustrates a method of assigning wealth scores to users' spouses according to the present invention. At 610, the present embodiment continues to proceed from the step 606 in FIG. 6A. At 611, the present embodiment obtains a picture, photo or image of the person's spouse. It can be done by uploading a picture by a user, or capturing a picture from a camera. At 612, the present embodiment analyzes the picture and obtains one or many face Feng Shui attributes of the person's spouse. At 613, the present embodiment compares the obtained face Feng Shui attributes of the person's spouse with stored face Feng Shui attributes of one or many wealthy peoples' spouses. At 614, the present embodiment, based on the comparation, finds one or many wealthy peoples' spouses whose faces Feng Shui attributes match, close-match, or are similar to the face Feng Shui attributes of the person's spouse, and obtains the similarity or match percentage between the face Feng Shui attributes of person's spouse and face Feng Shui attributes of the matched or close-matched wealthy people's spouses. At 615, the present embodiment assigns one or many wealth scores to the person's spouse based on the similarity percentage between the face of the person's spouse and the face of the matched or close-matched wealthy peoples' spouses. At 616, the present embodiment assigns one or many wealth scores to the person and the person's spouse (the family of the person) based on the wealth scores of the matched or close-matched wealthy people and the wealth scores of the matched wealthy peoples' spouses, the similarity or match percentage between the person's face Feng Shui attributes and the matched wealthy peoples' Feng Shui attributes, the similarity or match percentage between the face Feng Shui attributes of the person's spouse and the face Feng Shui attributes of the matched wealthy peoples' spouses, based on their different combinations. At 616, the present embodiment may assign one or many wealth scores to the person's spouse based on the similarity or match percentage between the face Feng Shui attributes of the person's spouse and the face Feng Shui attributes of the matched wealthy peoples' spouses.

Figure 6C:
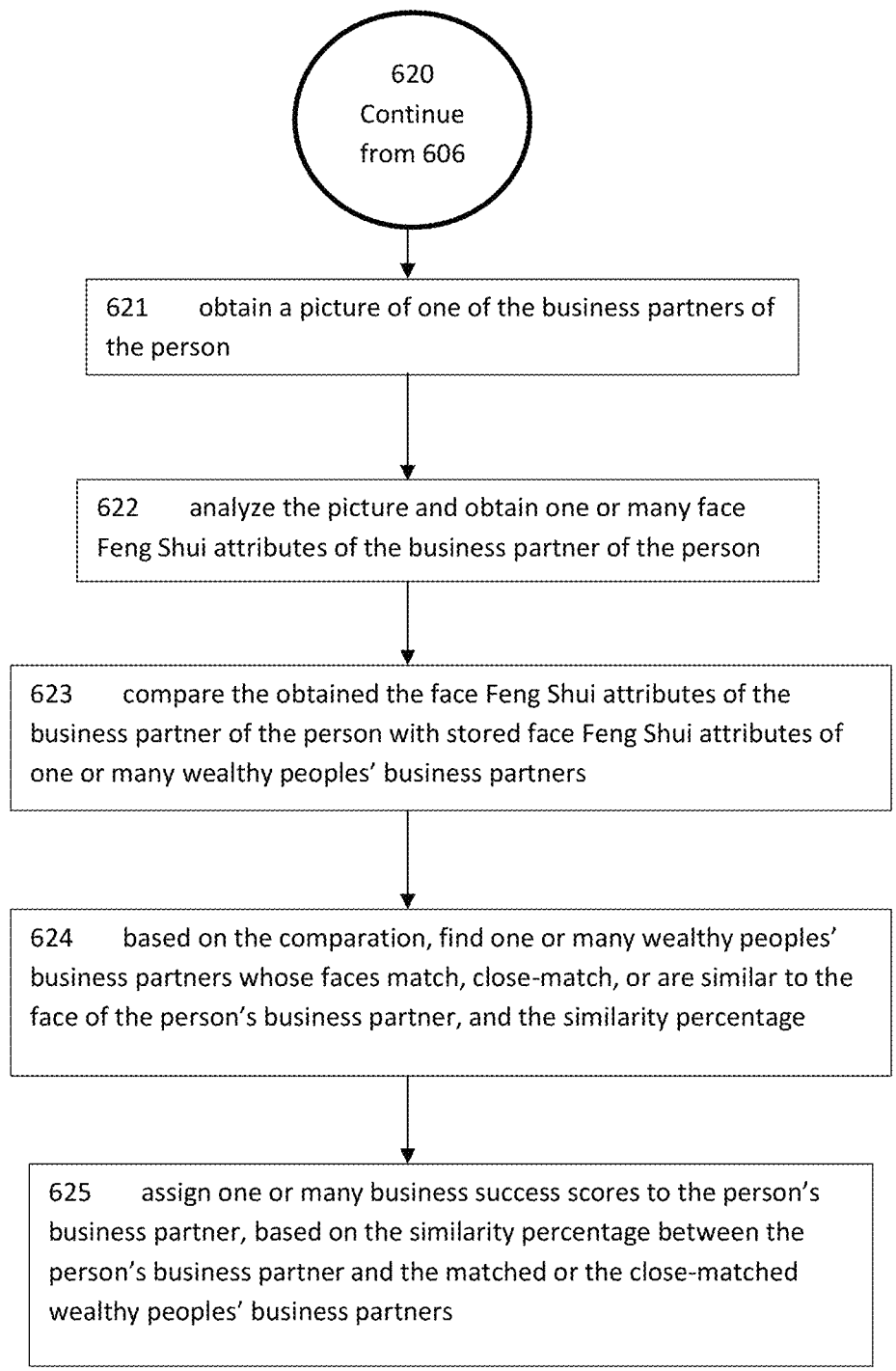
FIG. 6C is a flowchart illustrating a method of assigning business success scores to a person's business partners.

FIG. 6C illustrates a method of assigning wealth scores to users' business partners according to the present invention. At 620, the present embodiment continues to proceed from the step 606 in FIG. 6A. At 621, the present embodiment obtains a picture, photo or image of one of the person's business partners. It can be done by uploading a picture by a user, or capturing a picture from a camera. At 622, the present embodiment analyzes the picture and obtains one or many face Feng Shui attributes of the person's business partner. At 623, the present embodiment compares the obtained face Feng Shui attributes of the person's business partner with stored face Feng Shui attributes of one or many wealthy peoples' business partners. At 624, the present embodiment, based on the comparation, finds one or many wealthy peoples' business partners whose face Feng Shui attributes match, close-match, or are similar to the face Feng Shui attributes of the person's business partner, and obtains the similarity or match percentage between the face Feng Shui attributes of person's business partner and the face Feng Shui attributes of the matched or close-matched wealthy peoples' business partners. At 625, the present embodiment assigns one or many business success scores to the person's business partner, based on the similarity or match percentage between the face Feng Shui attributes of person's business partner's and the face Feng Shui attributes of the matched or close-matched wealthy peoples' business partners, or the wealth scores of the matched or the close-matched wealthy peoples' business partners.

In FIG. 6A, the stored wealthy people are categorized by gender, ethnicity, religion, region, age, profession, education, industry, and etc. In this case, the present embodiment obtains the person's category by using image analyzing, big data, artificial intelligence (AI), machine learning technologies, and compares the face Feng Shui attributes of the person with the face Feng Shui attributes of the wealthy people who are in the same category of the person in.

In FIGS. 6A, 6B and 6C, the stored wealthy people can be, for example, are the billionaires in the world. The store wealthy people can also be virtual models of the richest people in the world. The virtual models can be generated or designed by data scientists or by using big data, artificial intelligence (AI) or machine learning technologies based on many real rich people samples from different gender, ethnicity, religion, region, age, profession, education, industry, and etc. One example of the virtual wealthy model is SILICON IT group, which is generated based on the samples of the richest IT people from Silicon Valley. In this case, the present embodiment, before the step of comparing, obtains the person's profession and location, which can be done by searching the person's social networks, or by prompting a question asking the person's profession. The present embodiment also includes the steps of suggesting or recommending Feng Shui products to the person to improve his or her Feng Shui status. The present embodiment displays the wealth scores of the person, and the recommended Feng Shui products. The present embodiment obtains events or stories history time-line for the stored wealthy people, and displays the events or stories if the person's age matches the wealthy peoples' age at which the events occur. For example, the person, who face is similar to Bill Gate's face, is 20-year-old now. Thus, the present embodiment displays "In 1976, a 20-year-old college kid, Bill Gates, and his partner, Paul Allen, formed a company, MICROSOFT". The present embodiment also displays or presents the events or successful stories of the matched or close-matched wealthy people in a history time-line mode to the person.

The above system units or method steps can be implemented by hardware, software, or combinations of hardware and software, or even by third party API or solutions, or other technologies. Although the invention has been described with reference to the above-described embodiments and examples, it will be appreciated that many other variations, modifications, and applications may be devised in accordance with the broad principles of the invention disclosed herein. The invention, including the described embodiments and examples and all related variations, modifications and applications is defined in the following claims.

Therefore, the forgoing is considered as illustrative only of the principles of the invention. Furthermore, since numerous modifications and changes will readily occur to those skilled in the art, it is not desired to limit the invention to the exact construction and operation shown and described. Accordingly, all suitable modifications and equivalents may be resorted to, falling within the scope of the invention.

The invention claimed is:

1. A product system comprising:
  means for obtaining one or many face attributes of a person;
  a comparing unit for comparing the face attributes of the person with one or many stored face attributes of one or many well-known people, and finding or obtaining one or many matched or close-matched well-known people whose face attributes match, close-match, or are similar to the face attributes of the person;
  a product unit for searching or finding one or many skincare, haircare, makeup, cosmetics, healthcare, beauty or fashion products which are used, recommended or promoted by the matched or close-matched well-known people;
  means for displaying, listing or presenting one or many the found skincare, haircare, makeup, cosmetics, healthcare, beauty or fashion products to the person.

2. The system of claim 1 wherein the obtaining face attributes means further comprises:
  means for obtaining a picture, image or photo of the person;
  a picture analyzing unit for analyzing the picture, image or photo of the person, and obtaining one or many face attributes of the person.

3. The system of claim 1 wherein the obtaining face attributes means further comprises:
  means for obtaining the person's name or identification data;
  means for, based on the person's name or identification data, searching from a database, a search engine or a third-party system, and finding or obtaining one or many face attributes of the person.

4. The system of claim 1 further comprising
  means for displaying or presenting the pictures, images, animations or videos of the matched or close-matched well-known people to the person.

5. The system of claim 1 further comprising:
  means for obtaining one or many beauty or handsome scores of the matched or the close-matched well-known people;
  means for obtaining or determining a percentage of the similarity or match between the face attributes of the person and the fact attributes of the matched or close-matched well-known people;
  means for assigning a beauty or handsome score to the person based on the beauty or handsome scores of the matched or close-matched well-known people and the percentage of the similarity or match between the face attributes of the person and the face attributes of the matched or close-matched well-known people.

6. The system of claim 1 further comprising:
  means for playing commercial advertisements starring the matched or the close-matched well-known people to the person.

7. The system of claim 1 further comprising:
  means for comparing the obtained face attributes of the person with the stored face attributes of one or many sales or customer service people, and finding one or many sales or customer service people whose face attributes match or close-match the face attributes of the person;
  means for opening an on-line live showroom, and allowing the matched or close-matched sales or customer service people to show or demo one or many products in the live showroom to the person.

8. The system of claim 1 further comprising:
  means for obtaining one or many face Feng Shui attributes of the person;
  a comparing unit for comparing the face Feng Shui attributes of the person with one or many stored face Feng Shui attributes of one or many wealthy people, and finding or obtaining matched or close-matched wealthy people whose face Feng Shui attributes match, close-match, or are similar to the face Feng Shui attributes of the person;
  means for obtaining or determining a percentage of the similarity or match between the face Feng Shui attributes of the person and the face Feng Shui attributes of the matched or close-matched wealthy people;
  means for obtaining one or many wealth scores of the matched or close-matched wealthy people based on their wealth values or ranks;
  means for assign a wealth score to the person based on the wealth scores of the matched or close-matched wealthy people and the obtained or determined similarity or match percentage.

9. The system of claim 8 further comprising:
means for obtaining one or many face Feng Shui attributes of the person's spouse;
means for comparing the face Feng Shui attributes of the person's spouse with one or many stored face Feng Shui attributes of the matched or close-matched wealthy peoples' spouses, and finding or obtaining the matched or close-matched wealthy peoples' spouses whose face Feng Shui attributes match, close-match, or are similar to the face Feng Shui attributes of the person's spouse;
means for obtaining or determining a percentage of the similarity or match between the face Feng Shui attributes of the person's spouse and the face Feng Shui attributes of the matched or close-matched wealthy peoples' spouses;
means for assign a wealth score to the person's spouse based on the obtained or determined percentage of the similarity or match between the face Feng Shui attributes of the person's spouse and the face Feng Shui attributes of the matched or close-matched wealthy peoples' spouses.

10. The system of claim 1 further comprising:
means for obtaining one or many face Feng Shui attributes of a business partners of the person;
means for comparing the face Feng Shui attributes of the person's business partner with one or many stored face Feng Shui attributes of the matched or close-matched wealthy peoples' business partner, and finding or obtaining the matched or close-matched wealthy peoples' business partners whose face Feng Shui attributes match, close-match, or are similar to the face Feng Shui attributes of the person's business partner;
means for obtaining or determining a percentage of the similarity or match between the face Feng Shui attributes of the person's business partner and the face Feng Shui attributes of the matched or close-matched wealthy peoples' business partners;
means for assign a business success score to the person's business partner based on the obtained or determined percentage of the similarity or match between the face Feng Shui attributes of the person's business partner and the face Feng Shui attributes of the matched or close-matched wealthy peoples' business partners.

11. The system of claim 1, wherein the well-known people are movie starts, sports stars, singers, musicians, novel or poetry writers, politicians, artists, designers, scientists, or other celebrities, or even sales people.

12. A computer implemented method of selecting or presenting products according to the present invention comprising:
obtaining one or many face attributes of a person;
comparing the face attributes of the person with one or many stored face attributes of one or many well-known people, and finding or obtaining one or many matched or close-matched well-known people whose face attributes match, close-match, or are similar to the face attributes of the person;
searching or finding one or many skincare, haircare, makeup, cosmetics, healthcare, food, drinks, drinks, cars, fitness equipment or services, treatments, exercises or surgeries, beauty or fashion products which are used, recommended or promoted by the matched or close-matched well-known people;
displaying, listing, playing or presenting the found products or services to the person.

13. The method of claim 12 further comprising:
displaying one or many pictures or playing videos of the matched or close-matched well-known people to the person.

14. The method of 12 wherein the matched or close-matched well-known people are sales people, and the method further comprises:
opening a on-line live showroom for allowing the matched or close-matched sales people to show or demo one or many products to the person, or interact with the person to answer questions of the person or ask the person questions.

15. The method of 13 wherein the on-line showroom is enabled by virtual reality and allow the person to experience first-hand or touch on the products.

16. A computer implemented method of assign wealth scores according to the present invention comprising:
obtaining one or many face Feng Shui attributes of a person;
comparing the face Feng Shui attributes of the person with one or many stored face Feng Shui attributes of one or many wealthy people, and finding or obtaining one or many matched or close-matched wealthy people whose face Feng Shui attributes match, close-match, or are similar to the face Feng Shui attributes of the person;
obtaining or determining a percentage of the similarity or match between the Feng Shui attributes of the person and the Feng Shui attributes of the matched or the close-matched wealthy people;
assigning a wealth score to the person based on the stored wealth scores or ranks of matched or close-matched wealthy people, and the percentage of the similarity or match.

17. The method of claim 16 further comprising:
obtaining one or many face Feng Shui attributes of the person's spouse;
comparing the face Feng Shui attributes of the person's spouse with one or many stored face Feng Shui attributes of one or many wealthy people's spouses, and finding or obtaining one or many matched or close-matched wealthy people's spouses whose face Feng Shui attributes match, close-match, or are similar to the face Feng Shui attributes of the person's spouse;
obtaining or determining a percentage of the similarity or match between the Feng Shui attributes of the person's spouse and the Feng Shui attributes of the matched or the close-matched wealthy people's spouses;
assigning a wealth score to the person's spouse based on the percentage of the similarity or match between the Feng Shui attributes of the person's spouse and the Feng Shui attributes of the matched or the close-matched wealthy people's spouses.

18. The method of claim 16 further comprising:
obtaining one or many face Feng Shui attributes of a business partner of the person;
comparing the face Feng Shui attributes of the person's business partner with one or many stored face Feng Shui attributes of one or many wealthy people's business partner, and finding or obtaining one or many matched or close-matched wealthy people's business partners whose face Feng Shui attributes match, close-match, or are similar to the face Feng Shui attributes of the person's business partner;
obtaining or determining a percentage of the similarity or match between the Feng Shui attributes of the person's business partner and the Feng Shui attributes of the matched or the close-matched wealthy people's business partners;

assigning one or many business success scores to the person's business partner based on the percentage of the similarity or match between the Feng Shui attributes of the person's business partner and the Feng Shui attributes of the matched or the close-matched wealthy people's business partners.

19. The method of claim 18 further comprising:

obtaining one or many events or stories of the matched or close-matched wealthy people;

displaying or showing the events or stories of the matched or close-matched wealthy people to the person.

20. The method of claim 18 further comprising:

obtaining one or many wealth values of the matched or close-matched wealthy people for each time period;

displaying or showing the wealth values in line or bar chart by the time periods.

\* \* \* \* \*